United States Patent Office 3,074,278
Patented Jan. 22, 1963

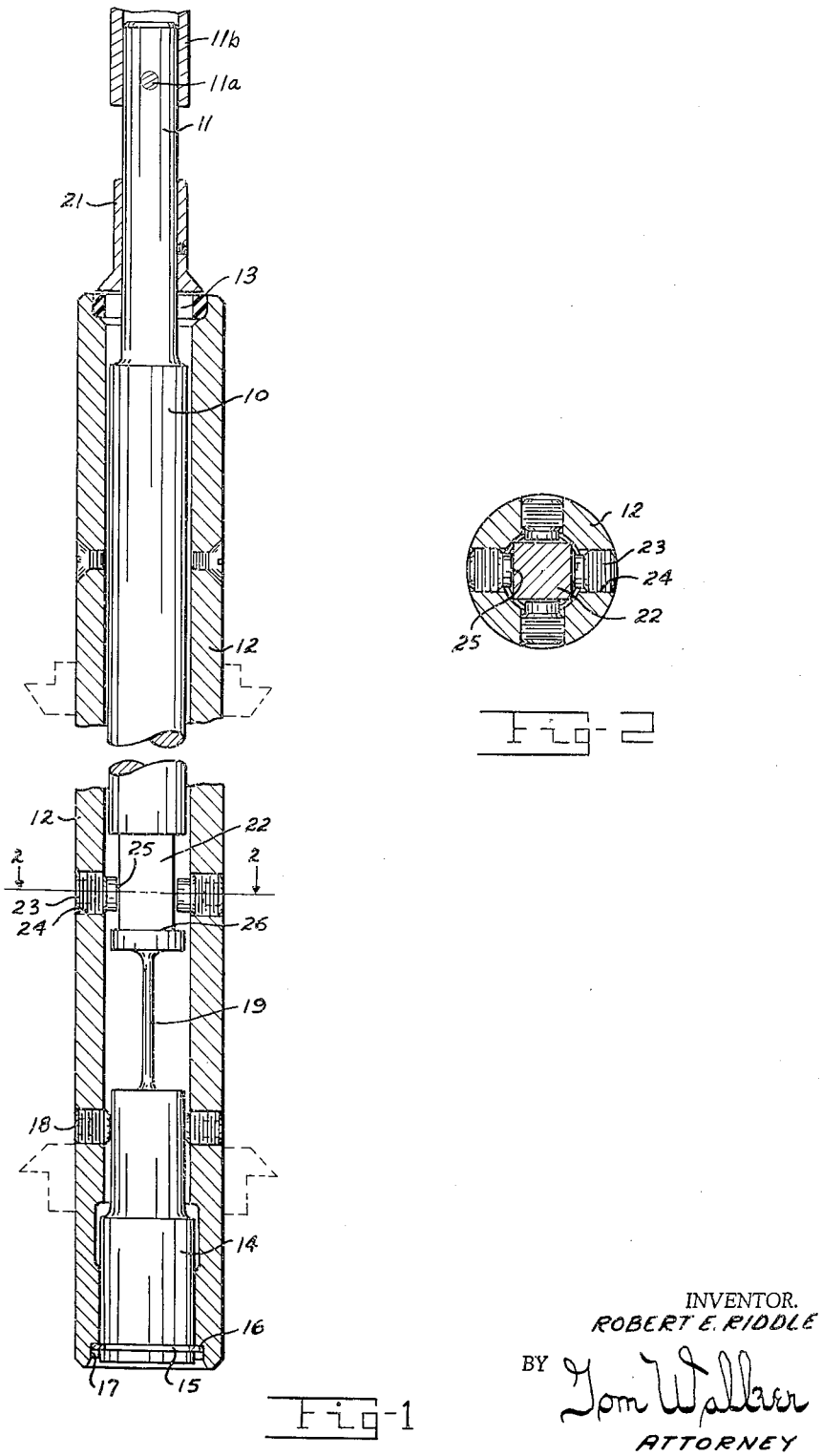

3,074,278
SAFETY SUPPORT STRUCTURE FOR
SUSPENSION BALANCER
Robert E. Riddle, West Caldwell, N.J., assignor to Marvel
Manufacturing Company, Caldwell, N.J., a partnership
Filed Oct. 29, 1958, Ser. No. 770,544
8 Claims. (Cl. 73—486)

This invention relates to self-aligning suspension balancers, and particularly to safety support structures incorporated therein as a guard against damage to the balancer device or injury to an attendant operator as the result of misoperation.

Although not so limited, the invention has especial application to self-aligning balancers as disclosed in Patent Number 2,647,398, issued August 4, 1953 to Andrew Marvel. As such, it is particularly concerned with suspension balancers characterized by a suspension rod, an arbor receiving the lower free end of the suspension rod and supported thereby, the arbor providing on its exterior a mounting for the article to be balanced, and the suspension rod being formed with a weakened portion at the location of which the rod may flex under a condition of unbalance, the suspension rod and the arbor assuming in response thereto relatively eccentric positions which in a suitable manner is made a measure of the degree and extent of unbalance.

The point of flexure of the suspension rod is, in a device of the kind described, a critical part of the balancer structure and since it is relatively weak can assume an unnatural configuration or be fractured if subjected to excessive tilting or torsional forces. Also, in the event of breaking of the suspension rod at such location, the arbor and its supported weight are released to fall from their suspended position with attendant possibilities of damage and personal injury.

The object of the invention is to simplify the construction as well as the means and mode of operation of safety support structures, whereby such structures may not only be economically manufactured, but will be more efficient and satisfactory in use, adaptable to a wide variety of applications, and be unlikely to get out of order.

A further object of the invention is to provide a safety feature in a balancer as described which will protect the suspension rod from the application of excessive tilting and torsional forces as described, and which will preclude a separation of the arbor from the suspension rod even though the suspension rod fracture as indicated.

A further object of the invention is to provide safety means as described which are free to carry out their intended purpose without restricting the proper functioning of the balancer.

A further object of the invention is to provide safety means as described adjustable to vary the extent of permitted flexing and twisting of the suspension rod and which is readily accessible for such adjustment.

FIG. 1 is a fragmentary view in longitudinal section of a balancing device in accordance with the illustrated embodiment of the invention; and FIG. 2 is a view in cross-section taken generally along the line 2—2 of FIG. 1.

Like parts are indicated by similar characters of reference throughout the several views.

Referring to the drawings, in accordance with the illustrative embodiment of the invention a self-aligning suspension balancer comprises an elongated suspension rod 10 having at its upper end a reduced diameter shank portion 11 at which point the rod is adapted to be suspended through a suitable flexible coupling from a support overhead with respect to the balancing device. The portion 11 may in this connection have a transverse pin 11a installed therein and interengaged with a support sleeve 11b. The body of the rod 10 is received in and enclosed by an arbor 12 which is adapted by use of mounting collars, as shown by phantom lines in FIG. 1, to mount on its exterior an article to be suspended with the suspension rod and arbor assembly being located at the center of the mass of such article. The rod 10 is received in a longitudinal bore 13 in the arbor, such bore being oversize with respect to the diameter or cross-sectional area of the suspension rod to permit relative tilting movements as between the suspension rod and the arbor. At its lower end the rod 10 is formed with an enlarged head portion 14 having a closer fit within the bore 13 and itself formed with a circumferential recess 15 in which is installed a snap ring 16. The periphery of the latter is in projecting relation to the head 14 and abuts the bottom of a shallow recess 17 in the lower extremity of the arbor 12 in a manner to support the arbor upon the suspension rod. The head 14 tends to align the rod 10 in a position of concentricity with the arbor 12, and to tend to constrain the lower part of the suspension rod to partake of tilting motions of the arbor. Radial adjusting screws 18 are mounted in the arbor 12, above the head 14 on the suspension rod, and engage the rod at circumferentially spaced points about the periphery thereof. The screws 18 thus aid in aligning the suspension rod within the arbor and in providing a positive connection between the arbor and the lower end of the suspension rod.

Above the adjustment screws 18 the rod 10 is cut away to leave a relatively thin connecting section 19 which thus becomes a weakened portion of the rod at the location of which limited flexing may occur. In a condition of unbalance, in an article supported on the arbor 12, the arbor tends to tilt. This force is applied to the bottom of the rod 10, below the section 19, through the head 14 and screws 18. A flexing of the rod 10 at the location of section 19 takes place in response to the application of these forces with the result that the upper part of the rod 10, above the section 19, assumes an eccentric position within the bore 13. Above the upper end of the arbor 12, the rod 10 carries on its shank 11 a sleeve 21 which may be calibrated in connection with the adjacent upper end of the arbor to obtain a reading of the extent and direction of unbalance.

Above the weakened section 19 a further portion of the rod 10 is cut away by the taking of angular cuts in the periphery of the rod to leave a circumferential series of lands or flats 22. In the illustrated instance, the cut away portion of the rod is made square to provide for equally spaced and equally dimensioned flats 22. Laterally aligned with each such flats is a set screw 23 having a threaded mounting in a radial opening 24 in the arbor 12. Projecting into the bore 13, each set screw 23 has an inner end formed with a broad flat surface 25 in parallel relation to a respective flat 22. Adjustment of the screw is such as to place such surface 25 in limited but normally non-contacting relation to the flat. The arrangement, it will be understood, is such as positively to preclude flexing of the suspension rod beyond a distance as defined by the setting of the several screws 23. A calibrated, initial adjustment of such screws provides for and insures a limiting of applied tilting forces so that the flexible section 19 is neither permanently bent nor fractured. The gap between the surface 25 of the several set screws and the flats 22 is such as to obtain the desired protection against the application of excessive tilting forces, without however intefering with the normal functioning of the balancer.

Torsional forces applied to the suspension rod, or to the arbor, or both, of a kind tending to twist the thin section 19 likewise are resisted or positively limited by the set screws 25. The relatively broad flats 22 contact the surfaces 25 of the set screws after relatively small amounts of torsional forces are applied whereby positively to limit the application of such forces in the same manner as in the limiting of the flexing or tilting motions.

The cuts made in the rod 10 to define the flats 22 form at the bottom thereof what is in effect an annular shoulder 26 which is in underlying, radially overlapping relation to the inner projecting ends of the set screws 23. This shoulder provides ledges to intercept and engage the projecting inner ends of the set screws in the event that fracture or breaking of the thin section 19 releases the arbor 12 to drop from the suspension rod. Engaging the shoulder 26, the screws 23 thus hold the arbor against free fall, inhibiting damage and injury as might result therefrom.

The safety means of the invention accordingly performs three functions in the balancer, (a) protecting the thin section 19 from the application of excessive sidewise forces, as might be exerted with a lateral pressure applied to the upper end of the rod while the arbor is held stationary, (b) the protection of the flexible section from the application of excesive torsional forces, and (c) an obviating of the dropping of the arbor together with any article that might be carried thereon as a result of breakage at the section 19.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Safety support structure in a suspension balancer, including a suspension rod adapted to be vertically suspended from one end thereof, an arbor having a longitudinal bore receiving the other end of said rod and a portion of the intermediate length of the rod, said bore and said rod being sized for relative tilting motion of the rod and arbor, means connecting said arbor to said rod whereby to support said arbor in a suspended condition, a reduced necked portion on said rod about which said rod may flex relatively to the arbor, and means for limiting relative tilting motions of said rod and for limiting gravity fall of said arbor in event of fracture of said necked portion.

2. Safety support structure in a suspension balancer according to claim 1, characterized in that said means acts further to limit twisting of said rod relatively to said arbor.

3. Safety support structure in a suspension balancer, including a suspension rod suspended at one end thereof, there being a weakened portion in said rod intermediate the ends thereof at the location of which the rod may flex and twist, said rod further being formed with a circumferential series of peripheral flats above said weakened portion, an arbor having a bore receiving the other end of said rod and a part of the length thereof, said rod being connected to said arbor in supporting relation thereto at a point below said weakened portion, and radially adjustable means carried by said arbor and extending into predetermined spaced relation to said peripheral flats to limit flexing and twisting of said rod.

4. Safety support structure in a suspension balancer according to claim 3, characterized by other means on said rod engaged by said adjustable means in the event of fall of said arbor to limit such fall.

5. Safety support structure in a suspension balancer including a suspension rod suspended at one end, there being a weakened portion in said rod intermediate the ends thereof at the location of which the rod may flex and twist, said rod further being formed above said weakened portion with a cut away portion providing a circumferential series of peripheral flats on the rod, an annular shoulder on said rod between said flats and said weakened portion, an arbor having a bore receiving the other end of said rod and a part of the intermediate length thereof, said rod being connected to said arbor below said weakened portion, and radially adjustable means carried by said arbor and projecting into said bore in predetermined spaced relation to said peripheral flats to limit flexing and twisting motions of said rod, said adjustable means being engageable on said annular shoulder to limit falling of said arbor in the event of fracture of said weakened portion.

6. Safety support structure in a suspension balancer according to claim 5, characterized in that said radially adjustable means is in the form of a circumferential series of set screws mounted in said arbor in lateral alignment with respective peripheral flats on said rod.

7. Safety support structure in a suspension balancer, including a suspension rod adapted to be vertically suspended at one end thereof, there being intermediate the ends of said rod a weakened portion at the location of which said rod may flex and twist, an arbor having a bore receiving the other end of said rod and a part of the intermediate length of said rod, said bore being sized to allow for relative flexing and twisting of said rod, means connecting said rod to said arbor at points remote from said one end of said rod and means on said rod and arbor above said weakened portion interengageable to limit flexing and twisting motion of said rod relative said arbor, said interengageable means comprising flatted surface portions on said rod and means mounted to and projecting radially inward of said arbor engageable therewith.

8. Safety support structure in a suspension balancer including, an arbor having a longitudinal bore therein, a rod received in said bore and having one end interengaged with said arbor to inhibit relative longitudinal and lateral motion at said one end, said rod intermediate its ends and at the other end thereof being spaced from the wall of said bore, said rod having intermediate its ends a thin section, said rod being subject to lateral and torsional stresses, and means between said thin section and the said other end of said rod protecting said thin section from the application of excesive lateral and torsional stresses, said last named means including studs set in said arbor, said rod being formed with a ledge engageable by said studs in event of breakage of said thin section to preclude a free fall of said arbor from said rod.

References Cited in the file of this patent

UNITED STATES PATENTS

| 174,496 | Dimock | Mar. 7, 1876 |
| 479,718 | Morgan and Scott | July 26, 1892 |
| 1,626,976 | Schoof | May 3, 1927 |
| 2,349,288 | Lannen | May 23, 1944 |
| 2,454,850 | Van Winkle et al. | Nov. 30, 1948 |
| 2,512,231 | Hart | June 20, 1950 |
| 2,534,980 | Lubahn | Dec. 19, 1950 |
| 2,647,398 | Marvel | Aug. 4, 1953 |